United States Patent [19]
Hurd

[11] 3,820,297
[45] June 28, 1974

[54] INTERFERENCE FIT BLIND FASTENER

[75] Inventor: Ramon L. Hurd, Royal Oak, Mich.

[73] Assignee: Huck Manufacturing Company, Detroit, Mich.

[22] Filed: Nov. 10, 1972

[21] Appl. No.: 305,459

Related U.S. Application Data

[63] Continuation of Ser. No. 104,053, Jan. 5, 1971, abandoned.

[52] U.S. Cl.................................. 52/758 F, 85/78
[51] Int. Cl............................................. F16b 13/06
[58] Field of Search......... 85/77, 78, 1 C; 52/758 F, 52/758 C

[56] References Cited
UNITED STATES PATENTS

| | | | |
|---|---|---|---|
| 3,279,304 | 10/1966 | Hopkins | 85/77 |
| 3,460,429 | 8/1969 | La Torre | 85/78 |
| 3,515,419 | 6/1970 | Baugh | 52/758 F |
| 3,522,177 | 7/1970 | Benz | 85/1 C X |
| 3,603,626 | 9/1971 | Whiteside | 52/758 F |
| 3,693,247 | 9/1972 | Brown | 52/758 F |

Primary Examiner—Werner H. Schroeder
Attorney, Agent, or Firm—Harness, Dickey & Pierce

[57] ABSTRACT

A blind fastener for securing a plurality of workpieces together and being located in a pair of aligned holes in the workpieces with the fastener providing a preselected interference with the holes in the workpieces.

20 Claims, 4 Drawing Figures

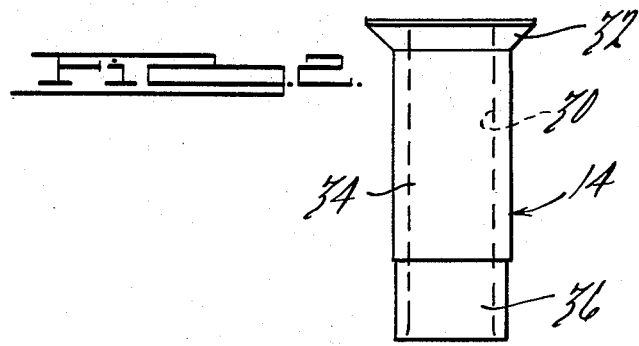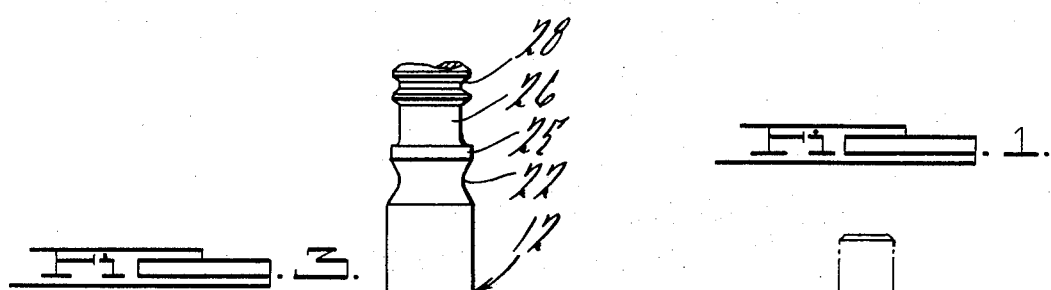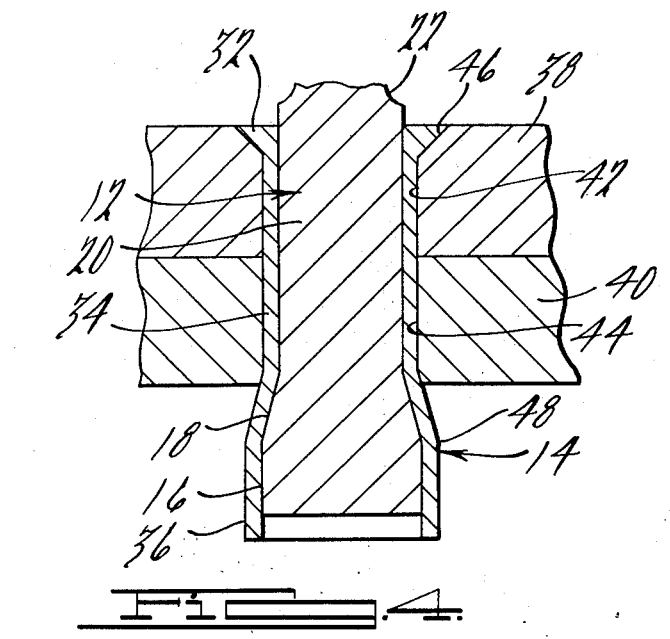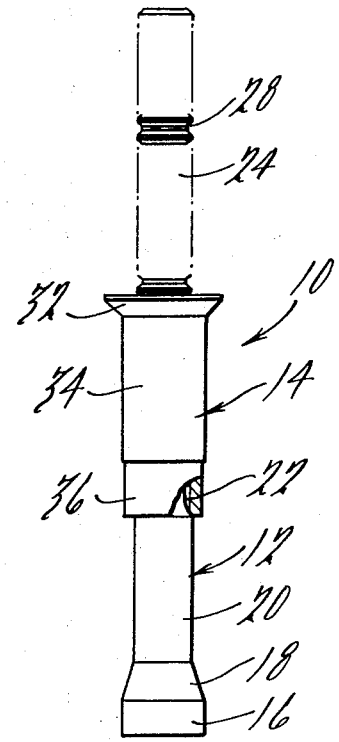

INTERFERENCE FIT BLIND FASTENER

This is a continuation of application Ser. No. 104,053, filed Jan. 5, 1971 now abondaned.

SUMMARY - BACKGROUND OF THE INVENTION

The present invention relates to blind fasteners.

It has been found that structural joints assembled with multiple piece fasteners, including a pin and sleeve or collar, have desirable fatigue and other characteristics, if the fastener is located within the holes of the workpieces with a preselected inteference fit. This has been accomplished with fasteners including headed bolts, such as the lock bolt and the like. These, however, are not blind fasteners and it would be desirable to provide the desired interference fit with a blind fastener; this is accomplished by a structure as shown in the present invention. Therefore it is an object of the present invention to provide a novel structural joint utilizing a blind fastener which provides an interference fit; it is another object to provide a novel fastener construction.

Other objects, features, and advantages of the present invention will become apparent from the subsequent description and the appended claims, taken in conjunction with the accompanying drawings, in which:

FIG. 1 is a side elevational view with some parts shown broken away of a fastener embodying features of the present invention;

FIG. 2 is an enlarged side elevational view showing the sleeve of the fastener of FIG. 1;

FIG. 3 is an enlarged side elevational view showing the pin of the fastener of FIG. 1;

FIG. 4 is an enlarged sectional view showing a novel structural joint including the fastener of FIGS. 1-3.

Looking now to the drawings, a blind fastener assembly 10 is shown in FIG. 1 and includes a pin 12 (FIG. 3) and a sleeve 14 (FIG. 2). The pin 12 has an enlarged head 16 connected to a reduced diameter smooth shank portion 20 via a tapered portion 18. A breakneck groove 22 is connected to the shank portion 20 and to a gripping portion 24 via a land 25 and a reduced diameter portion 26. The gripping portion 24 comprises a plurality of annular pull grooves 28 which facilitate gripping of the pin 12 whereby the fastener 10 can be set by a tool of known construction.

Cooperating with the pin 12 is the sleeve 14 which is hollow, having a uniform through bore 30. The sleeve 14 has an enlarged, frusto conically shaped head portion 32 connected to a smooth shank 34 which terminates in a reduced diameter portion 36. The bore 30 of sleeve 14 is larger in diameter than the pull portion 24 of pin 12 and hence the sleeve 14 slips readily over that portion; however, the land 25 is slightly larger in diameter than the bore 30 and hence when the sleeve 14 is assembled to the pin 12 the end portion 36 will be slightly expanded as it frictionally engages the land 25; in this manner the two pieces are held together while at the same time the end portion 36 will assume an expanded diameter no greater than the remainder of the shank 34.

The fastener 10 can be used to secure a pair of workpieces 38 and 40 which are provided with aligned bores 42 and 44, respectively. Bore 44 is uniform while bore 42 terminates in a frusto conically shaped portion 46. In operation the fastener 10, assembled as shown in FIG. 1, is located in the bores 42 and 44 with the enlarged head 32 portion of sleeve 14 matingly located in the conical bore portion 46. The shank 34 of the sleeve 14 is located in bores 42 and 44 with a close tolerance fit and extends partially beyond the end wall of the workpiece 40. Next a relative axial force is applied between the pin 12 and sleeve 14; this can be done by a known tool which grips the pull grooves 28 of the pin 12 and pulls the pin 12 while applying a reaction force to the head portion 32. As the pin 12 is pulled, the shank portion 20 of the pin 12 is moved into the bore 30 of the sleeve 14. While the land 25 provides a slight interference with bore 30, the shank portion 20 is of a still greater diameter than land 25 with this latter diameter selected to provide a desired first interference with the bore 30; this desired interference is selected to cause expansion of the sleeve 14 whereby it will expand in the workpiece bores 42, 44 to provide the necessary second interference to stress the bores 42, 44 the desired amount. As the head 16 is pulled into the bore 30 the tapered portion 18 expands the free end of the sleeve 14 to form an enlarged, tulip head 48. When the tapered portion 18 moves to a position in line with the rear surface of workpiece 40 the motion of the pin 12 is effectively stopped and the pulling force of the tool increases until a preselected magnitude is reached at which the pin 12 will break at the breakneck 22, leaving the installed fastener as shown in FIG. 4. The remainder of pin 12 will be frictionally held to the expanded sleeve 14.

There have been fasteners similar in general physical appearance to that shown in the drawings; these fasteners also have provided for expansion of the sleeve to fill the holes in the workpieces; however, such fasteners have utilized a pin member designed to wire draw after initial sleeve expansion providing hole fill and hence there results little effective stressing of the workpiece holes. The desired interference is not provided however, merely by preventing wire drawing by increasing the strength of the pin since ancillary problems such as sleeve extrusion, excessive installation loads, etc., can occur. In the present invention an interference fit blind fastener is provided by careful balancing of the strengths of the pin 12 and sleeve 14 considering the characteristics of the material of the workpieces 38, 40.

The magnitude of the final, desired interference between the set fastener and the hole will vary as a function of the area or of the diameter of the hole. This interference in terms of expansion in hole diameter can be expressed as a percentage, i.e., interference to hole diameter. It is desirable that this percentage interference be between 1 percent and 3 percent with the preferred range being between 2 percent and 3 percent. Thus in one application for a 7/32 hole (bores 42, 44) the difference between the diameter of shank portion 20 and bore 30 was selected to be between 0.0052 inch to 0.0067 inch. The initial clearance tolerance between bores 42, 44 and sleeve 14, considering permissible variations in hole diameter (bores 42, 44) and variations in the outside diameter of the shank portion 34 of sleeve 14, was selected to be between 0.0005 inch to 0.0030 inch. The net result is that the set fastener provides an interference in the bores 42, 44 of from 0.0022 inch – 0.0062 inch.

As noted in order to obtain the desired interference, the strengths of the pin 12 and sleeve 14 of the fastener 10 must be carefully balanced with the strength of the workpieces 38, 40. Thus the pin 12 must be of sufficient strength to withstand the frictional forces encountered during setting without significant wire drawing. The sleeve 14 should be of a strength whereby it will yield sufficiently to fill the holes 42, 44 and to expand the holes 42, 44 with the desired interference fit. The sleeve 14, however, should be of a sufficient strength such that it will not yield excessively and extrude. The workpieces 38, 40 also must be of sufficient strength such that the material around the holes 42, 44 will expand but will not yield appreciably and hence will not extrude; thus the workpieces 38, 40 should be of a strength close to or greater than that of the sleeve 14. In one construction satisfactory results were obtained utilizing (a) a high hardness pin 12 made of alloy steel AISI 8740 and having a hardness of around 49 – 52 Rc, (b) a sleeve 14 made of A286 stainless steel and having a hardness of around 36 – 40 Rc, and (c) workpieces 38, 40 made of annealed titanium 6A1-4V or 6A1-6V-2Sn and having a strength close to that of the sleeve 14. Note that the pin 12 is of a higher hardness than the sleeve 14. With the construction as noted above it was found advantageous to utilize an extreme pressure lubricant between the pin 12 and sleeve 14 to minimize the frictional forces. One such lubricant found to be satisfactory was a commercially available molydisulplide lubricant.

Thus, with the use of a fastener and workpiece combination of the present invention a blind fastener can be constructed and used to secure a pair of workpieces with a desired interference fit being created between the fastener and the openings to effectively stress the material in the opening resulting in a joint having good fatigue characteristics.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a joint construction the combination comprising: a pair of workpieces having aligned openings and a blind fastener for securing said workpieces together, said blind fastener comprising a hollow sleeve with a through bore and a pin, said pin having an enlarged head portion at one end and a shank portion proximate said head portion, gripping means at the end opposite from said head portion at which said pin can be gripped and a relative axial force applied between said sleeve and said pin, said pin being located partially within said sleeve with said gripping means, prior to setting of the fastener, extending beyond the free end of said sleeve and with said shank portion located at the blind side of said sleeve and out of said through bore prior to setting of the fastener, said sleeve having an outside diameter relative to the diameter of the openings whereby said sleeve can be located in said openings with a preselected minimum clearance, said shank portion having a diameter relative to the diameter of said through bore defining a first preselected interference, said first preselected interference being of a magnitude to expand said sleeve as said shank portion is moved into said through bore with the expansion of said sleeve being greater than said preselected clearance in order that said sleeve, upon setting of the fastener, expands the diameter thereof and produces a second preselected interference fit by expanding the bore of said openings, the strengths of the material of said pin, said sleeve, and said workpieces providing means operative to enable a desired magnitude of said second preselected interference fit with minimum wiredrawing of said pin, and minimum extrusion of said sleeve and said workpieces.

2. The assembly of claim 1 with the percentage of said second preselected interference to the diameter of said openings being between around 1 percent and 3 percent.

3. The assembly of claim 1 with the percentage of said second preselected interference to the diameter of said openings being between around 2 percent and 3 percent.

4. The assembly of claim 1 with said pin having a higher hardness than said sleeve and with the strength of the material of said workpieces being proximate to or greater than that of said sleeve.

5. The assembly of claim 1, with said pin being made of an alloy steel having a hardness of around 49 – 52 Rc and with said sleeve being made of an alloy steel and having a hardness of around 36 – 40 Rc and with said workpieces being made of titanium and having a strength close to or greater than the strength of said sleeve.

6. The assembly of claim 1 with said sleeve having a reduced outside diameter portion at said blind side.

7. The assembly of claim 6 with said sleeve having an enlarged, conical head portion at its free end which is locatable in a frusto conical portion at the free end of said openings, said pin having a weakened breakneck portion located between said gripping means and said shank portion.

8. The assembly of claim 7 with the percentage of said second preselected interference to the diameter of said openings being between around 1 percent and 3 percent.

9. The assembly of claim 7 with the percentage of said second preselected interference to the diameter of said openings being between around 2 percent and 3 percent.

10. The assembly of claim 8 with said pin having a higher hardness than and with said sleeve and strength of the material of said workpieces being proximate to or greater than that of said sleeve.

11. The assembly of claim 10, with said pin being made of an alloy steel having a hardness of around 49 – 53 Rc and with said sleeve being made of an alloy steel and having a hardness of around 36 – 40 Rc and with said workpieces being made of titanium and having a strength close to or greater than the strength of said sleeve.

12. The assembly of claim 11 including an extreme pressure lubricant located between said shank portion and said through bore.

13. The assembly of claim 1 including an extreme pressure lubricant located between said shank portion and said through bore.

14. The assembly of claim 5 with the percentage of said second preselected interference to the diameter of said openings being between around 1 percent and 3 percent.

15. The assembly of claim 1 with said sleeve having an enlarged, conical head portion at its free end which is locatable in a frusto conical portion at the free end of said openings, said pin having a weakened breakneck portion located between said gripping means and said shank portion.

16. The assembly of claim 15 with the percentage of said second preselected interference to the diameter of said openings being between around 1 percent and 3 percent.

17. The assembly of claim 16 with said pin having a higher hardness than said sleeve and with the strength of the material of said workpieces being proximate to or greater than that of said sleeve.

18. The assembly of claim 15, with said pin being made of an alloy steel having a hardness of around 49 – 52 Rc and with said sleeve being made of an alloy steel and having a hardness of around 36 – 40 Rc and with said workpieces being made of titanium and having a strength close to or greater than the strength of said sleeve.

19. The assembly of claim 15 including an extreme pressure lubricant located between said shank portion and said through bore.

20. The assembly of claim 1 wherein, said blind fastener, pin and sleeve are non tapered.

* * * * *